United States Patent
Qutub et al.

(10) Patent No.: US 9,799,215 B2
(45) Date of Patent: Oct. 24, 2017

(54) LOW POWER ACOUSTIC APPARATUS AND METHOD OF OPERATION

(71) Applicant: Knowles Electronics, LLC, Itasca, IL (US)

(72) Inventors: Sarmad Qutub, Des Plaines, IL (US);
Oddy Khamharn, Lombard, IL (US);
Dibyendu Nandy, Naperville, IL (US);
Martin Volk, Willowbrook, IL (US);
Robert Popper, Lemont, IL (US)

(73) Assignee: Knowles Electronics, LLC, Itasca, IL (US)

( * ) Notice: Subject to any disclaimer, the term of this patent is extended or adjusted under 35 U.S.C. 154(b) by 113 days.

(21) Appl. No.: 14/872,896

(22) Filed: Oct. 1, 2015

(65) Prior Publication Data
US 2016/0098921 A1 Apr. 7, 2016

Related U.S. Application Data

(60) Provisional application No. 62/058,998, filed on Oct. 2, 2014.

(51) Int. Cl.
*G08C 23/02* (2006.01)
*G06F 1/32* (2006.01)

(52) U.S. Cl.
CPC ........... *G08C 23/02* (2013.01); *G06F 1/3206* (2013.01); *G06F 1/3234* (2013.01)

(58) Field of Classification Search
CPC ..... G08C 23/02; G06F 1/3206; G06F 1/3234; G01H 3/12; H04B 11/00; H04B 17/318; H04B 17/23

USPC .................. 367/97, 132, 135, 197; 455/41.3
See application file for complete search history.

(56) References Cited

U.S. PATENT DOCUMENTS

| | | | |
|---|---|---|---|
| 5,432,755 A | 7/1995 | Komninos | |
| 5,539,705 A | 7/1996 | Akerman et al. | |
| 8,284,964 B2 * | 10/2012 | Windischberger | H04R 7/10 162/128 |
| 8,401,513 B2 * | 3/2013 | Langereis | G01S 15/06 367/118 |

(Continued)

FOREIGN PATENT DOCUMENTS

| | | |
|---|---|---|
| JP | 2010521861 | 6/2010 |
| KR | 1020090058393 | 6/2009 |

(Continued)

OTHER PUBLICATIONS

International Search Report and Written Opinion for PCT/US2015/053476 dated Jan. 13, 2016 (12 pages).

(Continued)

*Primary Examiner* — Ali Neyzari
(74) *Attorney, Agent, or Firm* — Foley & Lardner LLP

(57) ABSTRACT

A method of operating an acoustic system includes detecting an ultrasonic sound signal and pattern matching the received ultrasonic sound signal to determine when the received ultrasonic sound signal is a desired ultrasonic sound signal. The method includes sending a signal to at least one electronic component when the received ultrasonic sound signal is the desired ultrasonic sound signal. The method includes operating the microphone in a lower power state when the received ultrasonic sound signal is not the desired ultrasonic sound signal.

34 Claims, 12 Drawing Sheets

(56) References Cited

U.S. PATENT DOCUMENTS

| | | | |
|---|---|---|---|
| 8,447,615 B2* | 5/2013 | Tamir | G07C 9/00087 |
| | | | 704/273 |
| 9,199,380 B2* | 12/2015 | Smith | B25J 9/1694 |
| 2004/0095847 A1 | 5/2004 | Hassan | |
| 2005/0166672 A1 | 8/2005 | Atkinson | |
| 2007/0288277 A1 | 12/2007 | Neuhauser | |
| 2008/0013747 A1 | 1/2008 | Tran | |
| 2010/0040246 A1 | 2/2010 | Windischberger | |
| 2010/0315272 A1 | 12/2010 | Steele | |
| 2011/0003614 A1 | 1/2011 | Langereis | |
| 2011/0321149 A1 | 12/2011 | Tamir et al. | |
| 2012/0022375 A1 | 1/2012 | Deladi | |
| 2012/0171963 A1 | 7/2012 | Tsfaty | |
| 2013/0136267 A1 | 5/2013 | Hammerschmidt | |
| 2013/0158711 A1 | 6/2013 | Smith | |
| 2015/0193841 A1 | 7/2015 | Bernard | |

FOREIGN PATENT DOCUMENTS

| | | |
|---|---|---|
| KR | 20130050410 | 5/2013 |
| WO | 02054740 | 7/2002 |

OTHER PUBLICATIONS

International Search Report and Written Opinion for PCT/US2015/053481 dated Jan. 13, 2016 (11 pages).
Tile Reviewer's Guide, 7 pages, Aug. 2015.
International Search Report and Written Opinion for PCT/US2015/053469, dated Dec. 28, 2015 (10 pages).

* cited by examiner

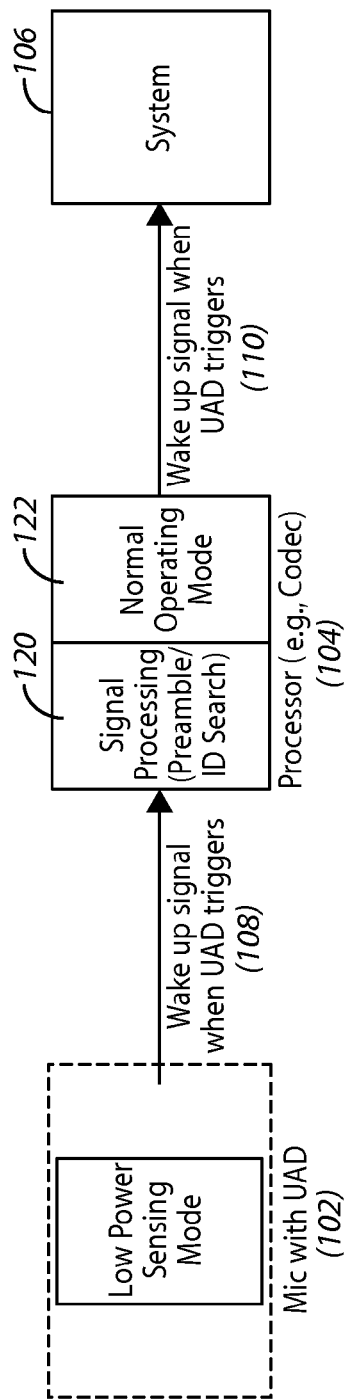
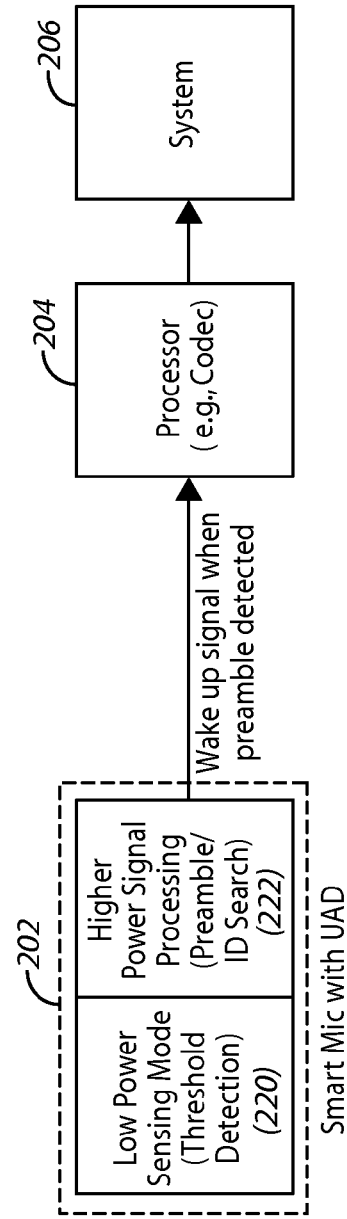

US 9,799,215 B2

LOW POWER ACOUSTIC APPARATUS AND METHOD OF OPERATION

CROSS-REFERENCE TO RELATED APPLICATION

This patent claims benefit under 35 U.S.C. §119(e) to U.S. Provisional Application No. 62/058,998 entitled "Low Power Acoustic Apparatus And Method Of Operation" filed Oct. 2, 2014, the content of which is incorporated herein by reference in its entirety.

TECHNICAL FIELD

This application relates to acoustic devices and, more specifically, to using ultrasonic approaches in these devices.

BACKGROUND OF THE INVENTION

Different types of acoustic devices have been used through the years. One type of acoustic device is a microphone, and one type of microphone is a microelectromechanical system (MEMS) microphone. In a MEMS microphone, a MEMS die includes a diagram and a back plate. The MEMS die is often disposed a substrate (or base) and is enclosed by a housing (e.g., a cup or cover with walls). A port may extend through the substrate (for a bottom port device) or through the top of the housing (for a top port device). In any case, sound energy traverses through the port, moves the diaphragm and creates a changing potential with respect to the back plate, which creates an electrical signal. An application specific integrated circuit (ASIC) may perform further processing on the signal. Microphones are deployed in various types of devices such as personal computers or cellular phones.

Unfortunately, previous approaches have limitations. Electrical audio systems include various power-consuming elements such as codecs. High amounts of power are consumed because the codec is typically always on for signal processing. Additionally, a limited bandwidth for ultrasonic frequencies is provided by these previous approaches depending upon the sampling rate of the codec.

All of these problems have resulted in some user dissatisfaction with previous approaches due to high power consumption and reduced battery life.

BRIEF DESCRIPTION OF THE DRAWINGS

For a more complete understanding of the disclosure, reference should be made to the following detailed description and accompanying drawings wherein:

FIG. 1 comprises a block diagram of low power acoustic system with no digital signal processor (DSP) in the microphone according to various embodiments of the present invention;

FIG. 2 comprises a block diagram of a low power acoustic system with a digital signal processor (DSP) disposed in the microphone according to various embodiments of the present invention;

Figure 3:
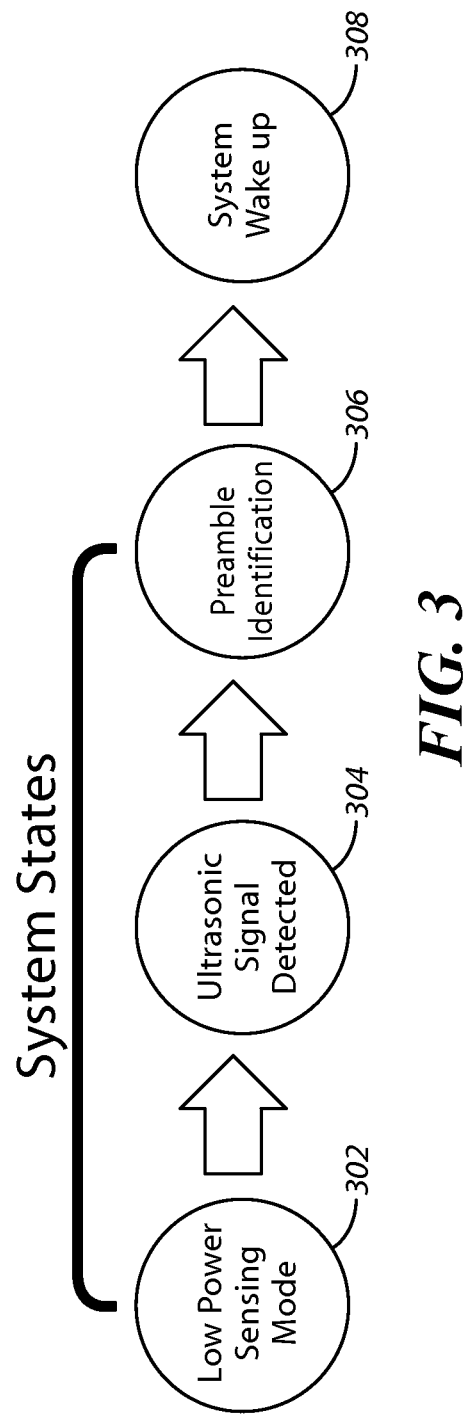
FIG. 3 comprises a flowchart of the operation of a low power acoustic system according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

In the approaches presented herein, codecs (or other processing devices) are deactivated (or operated in a low power state) when sensing for ultrasonic signals thereby providing for significantly less power consumption than previous systems. Ultrasonic signals are acoustic signals having a frequency above the human ear's audibility limit. The codecs (or other processing devices) are only activated when they need to be, e.g., when an ultrasonic signal (or some other meaningful signal) is detected. In some aspects, ultrasonic activity detection can be implemented in any system regardless of the type of processing device (e.g., codec) used. Additionally, ultrasonic signals are detected and processed automatically, with no user intervention required A sound transducer (e.g., a MEMS microphone, a piezoelectric microphone, a speaker, or some other transducer) and ultrasonic detector are used to detect ultrasonic signals and send a signal to one or more components in a system. In one aspect, an ultrasonic detector in a microphone triggers the wakeup of other components (e.g., a processor such as a codec) by supplying a wake up signal to the component to begin processing a received signal (e.g., a received ultrasonic signal). In other aspects, the transducer and ultrasonic detector are used to send a signal to an electronic component, such as a processor, which launches an application or modifies operation of the processor.

In another aspect, a microphone has two internal states. A first state is a low power sensing mode with threshold detection. When an ultrasonic signal is detected, the microphone wakes up a processor (e.g., a digital signal processor (DSP)) disposed in the microphone to perform a correlation or other pattern matching functions on the received signal. Other functions are possible. In a second state and if the desired signal is found, the microphone triggers a system wakeup for ultrasonic signal processing. If the desired signal is not found, then control returns to the first state. The system is in the low power sensing mode until an ultrasonic signal is detected at which point the microphone looks for a preamble or ID to wake up the codec to process ultrasonic signals for an application (e.g., an application launch, a payment receipt, a payment confirmation, a coupon receipt, or a command receipt to mention a few examples of applications). Although some of the approaches described herein are described with respect to microphones, it will be appreciated that the principles described herein are not limited to microphones but are applicable to all types of sensing arrangements with all types of sensors.

In many of these embodiments, an ultrasonic acoustic signal is detected at a microphone. The received ultrasonic sound signal is correlated (or pattern matched) to determine when the received ultrasonic sound signal is a desired ultrasonic sound signal. When the correlation indicates the received sound signal is the desired ultrasonic sound signal, at least one electronic component is woken up from an inactive or sleep state. When the signal correlation, pattern matching function, or other signal detection methods indicates the received ultrasonic sound signal is not the desired ultrasonic sound signal, the microphone is operated in a low power state of operation and does not wake up any other electronic components.

In some aspects, the correlation or pattern matching is performed at the microphone and the at least one electronic component comprises a processing device. The processor (e.g., codec) performs additional application-related processing functions. In another aspect, the correlating or pattern matching functions are performed, for example, by a digital signal processing (DSP) module, a codec, or some other processing device. In some examples, the DSP is in the microphone. In other examples, the microphone enters a processing state consuming more power than the low power state of operation when the correlating or the pattern matching is performed.

In some examples, the detecting comprises measuring a filtered signal strength and comparing the measured signal strength to a predetermined threshold. In other examples, the detecting comprises measuring a filtered signal strength and comparing the measured signal strength to an adaptive or user-changeable threshold.

In other aspects, the detecting utilizes a digital or analog filter. In other examples, received ultrasonic signals are shifted to baseband frequencies at a sub-sampled frequency rate by aliasing. Other examples are possible.

In still other aspects, when the detecting detects an ultrasonic sound signal, waking up a processing device (e.g., codec) to perform the correlating, such that the correlating or pattern matching is performed at the processor (e.g., codec). In some examples, waking up an electronic component is performed by transmitting a wake up signal to a component, where the component is separate from the processing device (e.g., codec) and the microphone.

In others of these embodiments, a microphone is operated in a first state of operation such that in the first state of operation the microphone receives a sound signal and determines whether the received signal is a desired ultrasonic sound signal. When the microphone senses a desired ultrasonic sound signal, it enters a second state of operation. The second state of operation consumes more power than the first state of operation. In the second state of operation, the microphone determines if the received signal is a desired ultrasonic sound signal using correlation or other pattern matching functions or algorithms. If it is a desired ultrasonic preamble or ID the microphone transmits a wake up signal to a processing device such as a codec or microprocessor. When the microphone determines that the received ultrasonic sound signal is not a desired ultrasonic sound signal, the microphone remains in the first state of operation.

In some aspects, the determination of whether the sound signal is a desired ultrasonic sound signal utilizes a measured filtered signal strength and a comparison is made between the signal strength and a predetermined threshold. In other aspects, the determination of whether the sound signal is a desired ultrasonic sound signal utilizes a measured filtered signal strength and a comparison is made between the signal strength and an adaptive and user-changeable threshold. In some aspects, the adaptive threshold that can adjust to ambient noise levels. In still other aspects, the adaptive threshold has the ability to turn off the microphone even when it detects ultrasonic signals if it identifies after a specified period of time that the signal does not contain an ID or preamble.

In some examples, a digital or analog filter is used to determine whether the received sound signal is a desired ultrasonic sound signal. In other examples, received ultrasonic signals are digitally shifted to baseband frequencies at a sub-sampled frequency rate by aliasing.

In yet others of these embodiments, an ultrasonic sound signal is detected at a transducer. Upon detecting the ultrasonic sound signal at the microphone, a first wake-up signal is transmitted to a processing device (e.g., codec). As used herein, a microphone can be any type of transducer. The first wake-up signal is received at the processing device (e.g., codec) and responsively wakes up the processing device (e.g., codec) from a low power processing state. At the processing device (e.g., codec), the received ultrasonic sound signal is correlated or pattern matched to determine if the received ultrasonic sound signal is a desired ultrasonic sound signal. When the correlating indicates the received sound signal is the desired ultrasonic sound signal, a second wake up signal is sent from the codec to at least one electronic component. When the correlating indicates the received ultrasonic sound signal is not the desired sound signal, the microphone continues to operate in a low power mode of operation.

In some aspects, the determination of whether the sound signal is a desired ultrasonic sound signal utilizes a measured filtered signal strength and a comparison is made between the signal strength and a predetermined threshold. In other aspects, the determination of whether the sound signal is a desired ultrasonic sound signal utilizes a measured filtered signal strength and a comparison is made between the signal strength and an adaptive and user-changeable threshold.

In some examples, detecting the ultrasonic sound signal is accomplished via a digital or analog filter. In other examples, at the codec the ultrasonic signals are digitally shifted to baseband frequencies at a sub-sampled frequency rate by aliasing.

It will be understood that the approaches described herein operate with inaudible signals beyond the human audible range of approximately 20 kHz range. This may be any signal that is inaudible to human beings which, while most are above 20 kHz, can be below 20 kHz.

In one approach, the sound transducer detects ultrasonic sound signals that are not produced by the human voice. For example, a smartphone may have a first sound transducer that receives ultrasonic sound signals and a second sound transducer that produces ultrasonic sound signals. When a user gestures in proximity to the smartphone, such as by waving his hand, the ultrasonic sound signals from the second sound transducer reflect off of the user's hand. The first sound transducer detects the reflected signals. The detected, reflected ultrasonic sound signals from the user's gesture(s) may be used to wakeup other components of the smartphone.

Another embodiment of sensing an ultrasonic sound signal is sensing an ultrasonic sound signal produced by another device. For example, a first smartphone having a sound transducer and a second smartphone may be near the first smartphone. The second smartphone may have a sound transducer that produces ultrasonic sound signals automatically or in response to user manipulation of the second smartphone. The sound transducer of the first smartphone is in a low power sensing mode. When the transducer in the first smartphone detects the ultrasonic sound signals from the second smartphone, it enters a higher power processing mode to process the ultrasonic signal. The first smartphone may use the detected ultrasonic sound signals from the second smartphone to wakeup other components or launch other applications of the first smartphone if a desired signature is found.

Referring now to FIG. 1, a low power acoustic system (with no processor disposed in the microphone) is described. The system includes a microphone with ultrasonic activity detection (UAD) 102, a processor (e.g., codec) 104, and system components 106.

The microphone with ultrasonic activity detection (UAD) 102 receives acoustic signals and sound energy. In one example, the microphone 102 may include a microelectromechanical system (MEMS) device (with a diaphragm and back plate) that converts sound energy into an electrical signal.

The codec or processor 104 receives signals from the microphone 102 and provides coding and/or decoding functions on these signals. For example, the processor 104 may convert analog signals into digital signals, may compress or de-compress the signals, or may perform other signal processing functions, to mention a few examples. The output of the processor 104 is transmitted to the system components 106.

In these regards, the processor 104 may include a signal processing module 120 and a normal operating mode module 122. The signal processing module 120 receives a first wake up signal 108 from the microphone, determines the presence of a preamble from the signal 108, and attempts to match the determined preamble with a list of one or more acceptable or known preambles that are approved for processing. This correlation indicates whether the received sound signal is the desired ultrasonic sound signal. In some aspects, the normal operating mode module 122 performs functions such as digital data conversion, signal processing, and signal amplification. Other examples of functions are possible.

The system components 106 may include any type of electronic component that performs any type of functionality. The system components may be associated with a cellular phone, personal computer or tablet to mention a few, but not all, examples.

In one example of the operation of the system of FIG. 1, an ultrasonic sound signal is detected at a microphone 102. Upon detecting the ultrasonic sound signal at the microphone 102, the first wake-up signal 108 is transmitted to a processor 104. The first wake-up signal 108 is received at the codec and responsively wakes up the processor 104. At the processor 104, the received ultrasonic sound signal is correlated (or pattern matched) to determine when the received ultrasonic sound signal is a desired ultrasonic sound signal. When the correlating (or pattern matching) indicates the received sound signal is the desired ultrasonic sound signal, a second signal is sent from the codec to the system components 106. The signal 110 may be a wake up signal 110 that causes one or more of the system components 106 to be woke up. As another example, the signal 110 may cause a processor of the system components 106 to launch an application. When the correlating indicates the received ultrasonic sound signal is not a desired sound signal, the microphone 102 and the processor 104 continue to operate in a low power mode of operation and the system is not woken up.

In other examples, the microphone 102 may be coupled directly to the system components 106 and wake these components up directly, without involving the processor 104.

In some aspects, the determination by the processor 104 of whether the sound signal is a desired ultrasonic sound signal utilizes a measured filtered signal strength and a comparison is made between the signal strength and a predetermined threshold. In other aspects, the determination by the processor 104 of whether the sound signal is a desired ultrasonic sound signal utilizes a measured filtered signal strength and a comparison is made between the signal strength and an adaptive or user-changeable threshold.

In some examples, detecting the ultrasonic sound signal is accomplished via a digital or analog filter. For example, the filter may be a high pass filter attenuating audio band frequencies. In other examples, at the processor 104 the ultrasonic signals are digitally shifted to a baseband frequency at a sub-sampled frequency rate by aliasing.

Referring now to FIG. 2, a low power acoustic system with processor in the microphone is described. The system includes a microphone with ultrasonic activity detection (UAD) 202, and a processor (e.g., codec) 204.

The microphone with ultrasonic activity detection (UAD) 202 includes a low power sensing module 220 and a higher power signal processing module 222. The low power sensing module 220 may include a microelectromechanical system (MEMS) device (with a diaphragm and back plate) that converts sound energy into electrical signals. The higher power signal processing module 222 determines the presence of a preamble from the signal received from the module 220, and attempts to match the determined preamble with a list of one or more acceptable or known preambles that are approved for processing. This correlation or pattern matching indicates whether the received sound signal is a desired ultrasonic sound signal.

The processor 204 receives signals from the microphone 202 and provides coding and/or decoding functions on these signals. For example, the codec may convert analog signals into digital signals, may compress or de-compress the signals, may perform other signal processing functions, to mention a few examples. The output of the processor 204 is transmitted to the system components 206. For example, the processor 204 may output a signal that wakes up a processor of the system components 206 or causes the processor of the system components 206 to launch an application.

The microphone 202 is operated in a first state of operation such that in the first state of operation the microphone determines whether or not an ultrasonic signal is detected. The microphone 202 receives a sound signal and determines if the received signal is a desired ultrasonic sound signal. When the microphone 202 determines that a desired ultrasonic signal is detected, the microphone 202 enters a second state of operation 222. The second state of operation may consume more power than the first state of operation. In the second state of operation the microphone processes the ultrasonic signal to determine if it contains a predefined ultrasonic ID or preamble. If it finds a desired ID or preamble, the microphone 202 transmits a wake up signal to the processor 204. When the microphone 202 determines that the received ultrasonic sound signal is not a desired ultrasonic sound signal, the microphone 202 returns to the first state of operation 220.

In some aspects, the determination by the module 222 of whether the sound signal is a desired ultrasonic sound signal utilizes a measured filtered signal strength and a comparison is made between the signal strength and a predetermined threshold. In other aspects, the determination by the module 222 of whether the sound signal is a desired ultrasonic sound signal utilizes a measured filtered signal strength and a comparison is made between the signal strength an adaptive or user-changeable threshold.

In some examples, a digital or analog filter is used by the module 220 to determine whether the received sound signal is a desired ultrasonic sound signal. In other examples, received ultrasonic signals are digitally shifted to baseband frequencies at a sub-sampled frequency rate using aliasing.

In other examples, the microphone 202 may be coupled directly to the system components 206 and wake these components up directly, without involving the processor 204.

Referring now to FIG. 3, the operation of a low power acoustic system is described. In this example, it is assumed that a microphone is being used. However and as stated above, it will be appreciated that the principles described herein are not limited to microphones but are applicable to all types of sensing arrangements with all types of sensors.

In a first low power sensing mode 302, the microphone senses for ultrasonic signals. In this mode, various components of the microphone are inactive or are operating in a low power operating mode.

Preamble identification is made at step 306. In this step and to use one example, it is determined if the preamble is in the received ultrasonic sound signal. If a preamble is present, the signal is correlated, pattern matched, or determined by means of an algorithm by comparing identification/preamble information in the signal to acceptable/recognized preamble/identification information. In other examples instead of recognizing a preamble, the detection of a frequency shift (e.g., produced by a person waiving their hand in front of a sensor) is made.

System wake up occurs at step 308. When the correlating indicates the received sound signal is the desired ultrasonic sound signal, a signal may be sent to wake-up system components. When the correlation indicates a desired ultrasonic signal has not been determined, then the low power state is again entered. In other approaches, step 308 may include sending a signal to one or more system components that are already awake. For example, the step 308 may include sending a signal to a processor that causes the processor to launch an application.

Figure 4A:
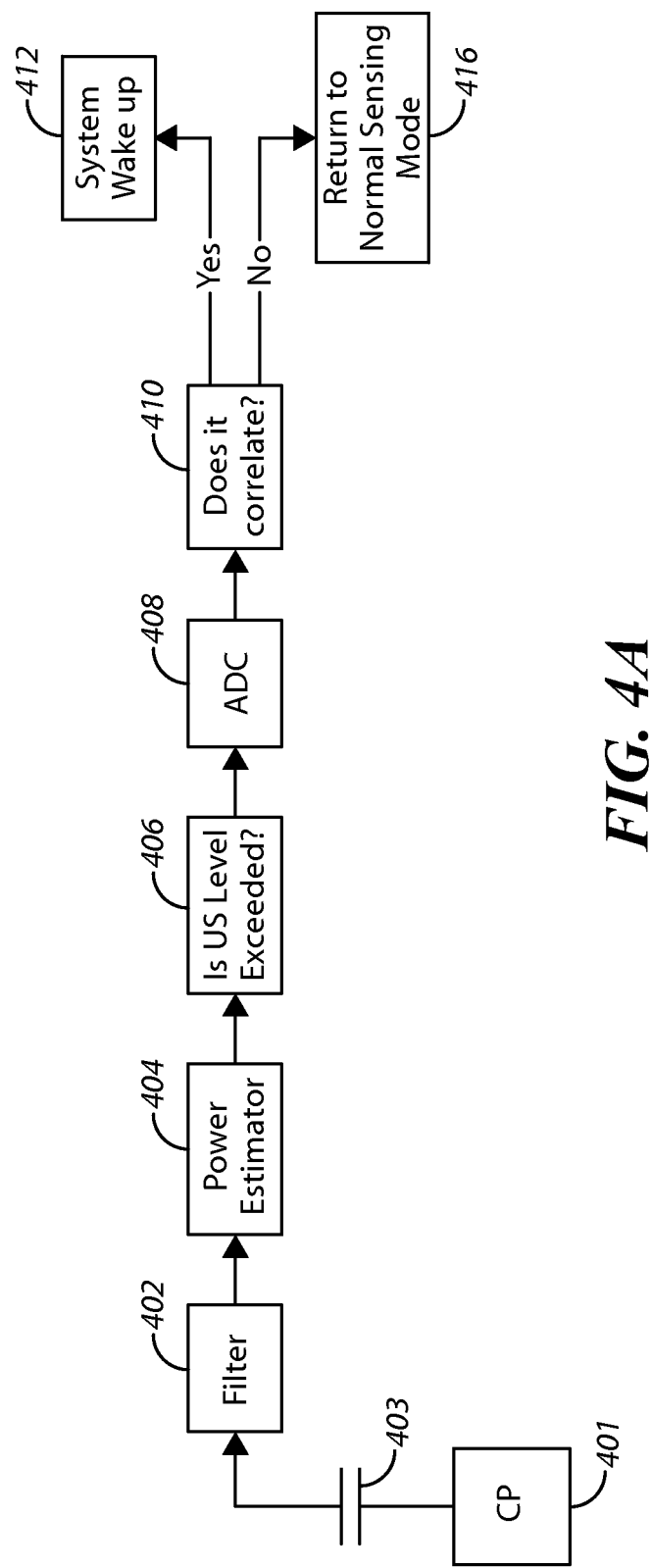
FIG. 4A comprises a block diagram of a detection circuit according to various embodiments of the present invention.

Referring now to FIG. 4A, one example of a detection approach is described. A charge pump 401 is coupled to a MEMS device 403, which is coupled to a filter 402, which is coupled to a power estimator 404.

The charge pump 401 supplies current, voltage, or power to operate the MEMS device 403. The MEMS device 403 includes a diaphragm and back plate and converts received sound energy (including ultrasonic signals) into electrical signals.

The filter 402 is used to filter unwanted noise and signals. The power estimator 404 determines the signal's power. At step 406 it is determined if the required power level is exceeded. If the answer is affirmative, an analog-to digital converter 408 converts the analog signal into a digital signal and at step 410 correlation or pattern matching the digital signal occurs as described elsewhere herein. If the correlation/pattern matching is affirmative, the system wakes up at step 412. If the answer is negative, the system returns to normal sensing mode at step 416.

Figure 4B:
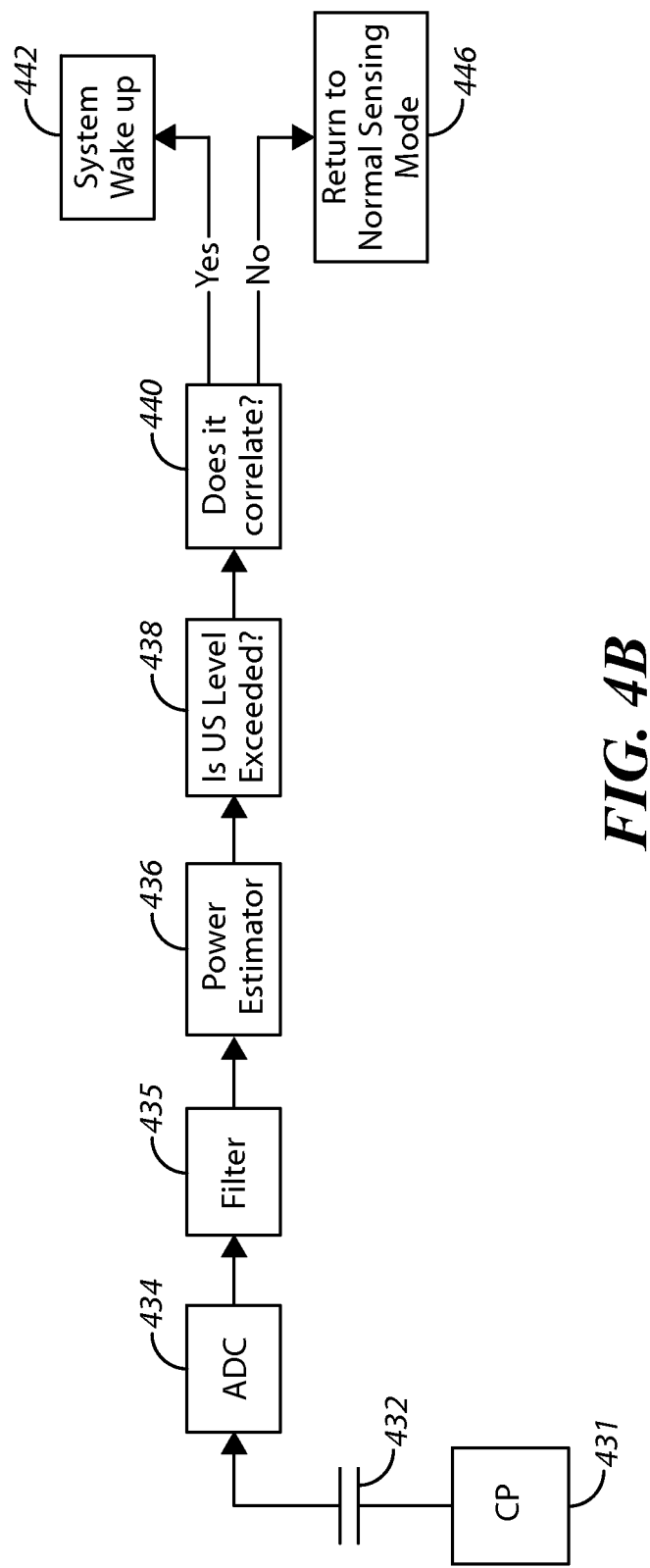
FIG. 4B comprises a block diagram of a detection circuit according to various embodiments of the present invention.

Referring now to FIG. 4B, one example of a detection approach is described. A charge pump 431 is coupled to a MEMS device 432, which is coupled to an analog-to-digital converter (ADC) 434, which is coupled to a filter 435, which is coupled to a power estimator 436.

The charge pump 431 supplies current, voltage, or power to operate the MEMS device 432. The MEMS device 432 includes a diaphragm and back plate and converts received sound energy (including ultrasonic signals) into electrical signals. The ADC 434 converts analog signals from the MEMS device 432 into digital signals.

The filter 435 is used to filter unwanted noise and the power estimator 436 determines the signal's power. At step 438 it is determined if the required power level is exceeded. If the answer is affirmative, at step 440 correlation or pattern matching the digital signal occurs as described elsewhere herein. If the correlation/pattern matching is affirmative, the system wakes up at step 442. If the answer is negative, the system returns to normal sensing mode at step 446.

Figure 5:
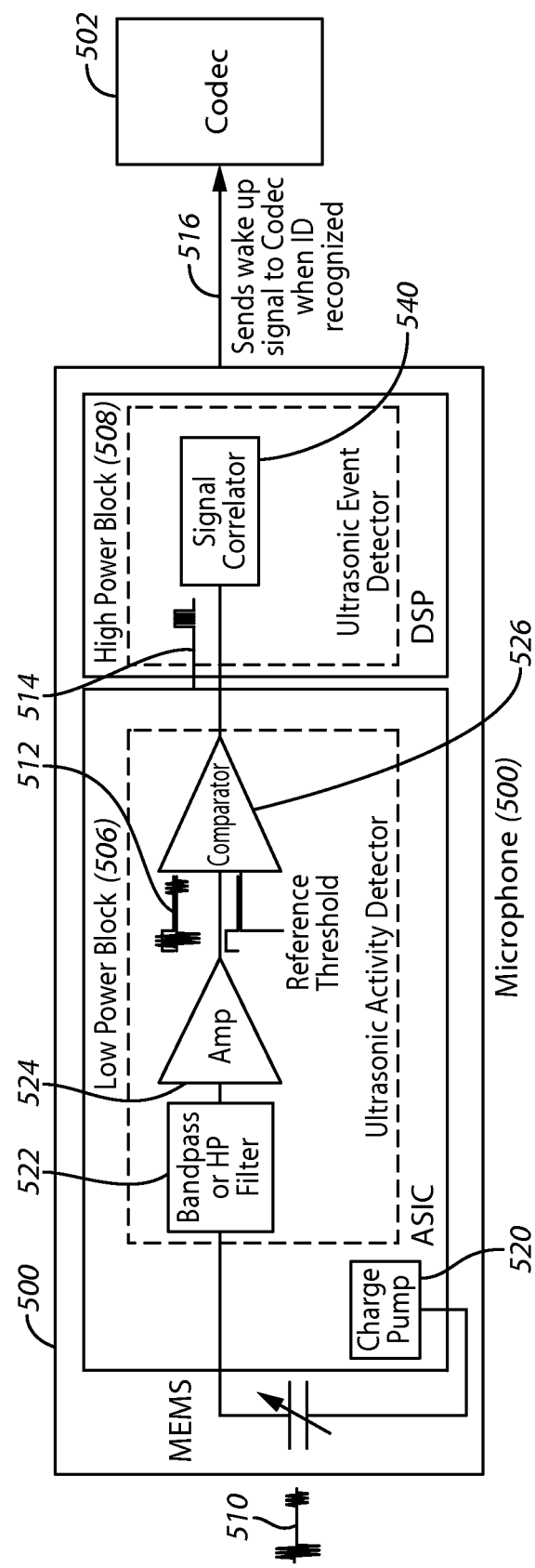
FIG. 5 comprises a block diagram with a microphone with a digital signal processor (DSP) according to various embodiments of the present invention.

Referring now to FIG. 5, a microphone 500 with a DSP or other processing device is described. The microphone 500 transmits signals to a processor (e.g., codec) 502. The processor (e.g., codec) 502 receives signals from the microphone 500 and provides coding and/or decoding functions on these signals. For example, the processor (e.g., codec) 502 may convert analog signals into digital signals, may compress or de-compress the signals, may perform other signal processing functions, to mention a few examples. The output of the processor (e.g., codec) 502 is transmitted to other system components.

The microphone 500 includes a MEMS device 504, a low power block 506, and a high power block 508. The MEMS device 504 includes a diaphragm and back plate, and converts sound energy 510 into an electrical signals.

The low power block 506 may be a single chip (piece of silicon) and be an application specific integrated circuit (ASIC). The components are configured to detect ultrasonic signals. The low power block 506 includes a charge pump 520, a band pass or high pass filter 522, an amplifier 524, and a comparator 526. Other components may also be present. The charge pump 520 provides current, voltage, or power to the MEMS device 504. The band pass or high pass filter 522 passes certain (e.g., high) ultrasonic frequencies and rejects other (e.g., lower) frequencies from the electrical signals produced by the MEMS device 504. The amplifier 524 amplifies the signals from the band pass or high pass filter 522 to produce signals 512 and a comparator 526 compares the signals to a threshold in order to ascertain that the incoming ultrasonic signal has an adequate signal strength, thereby producing signals 514. The signals 514 are sent to the high power block 508.

The high power block 508 (which may be a digital signal processing chip) includes a pattern matching module, such as a signal correlator (or other type of detector) 540 that performs correlation functions. More specifically, the correlator 540 looks for a preamble in the signal 514 and compares that to acceptable preambles/identifiers. When the preamble or the identification information is recognized, a signal 516 is sent from the microphone 500 to the processor (e.g., codec) 502 to wake the processor (e.g., application processor) 502 and the rest of the electrical system. If correlation does not identify the signal 514, then no signal is sent to the processor (e.g., application processor) 502 and the microphone continues to operate in a low power mode. In low power mode, the low power block 506 continues to sense signals, but the high power block 508 and the codec are in sleep mode (consuming no power or very small amounts of power).

The signal 510 may be encode using frequency shift keying, frequency modulation, and other processing techniques.

Figure 6:
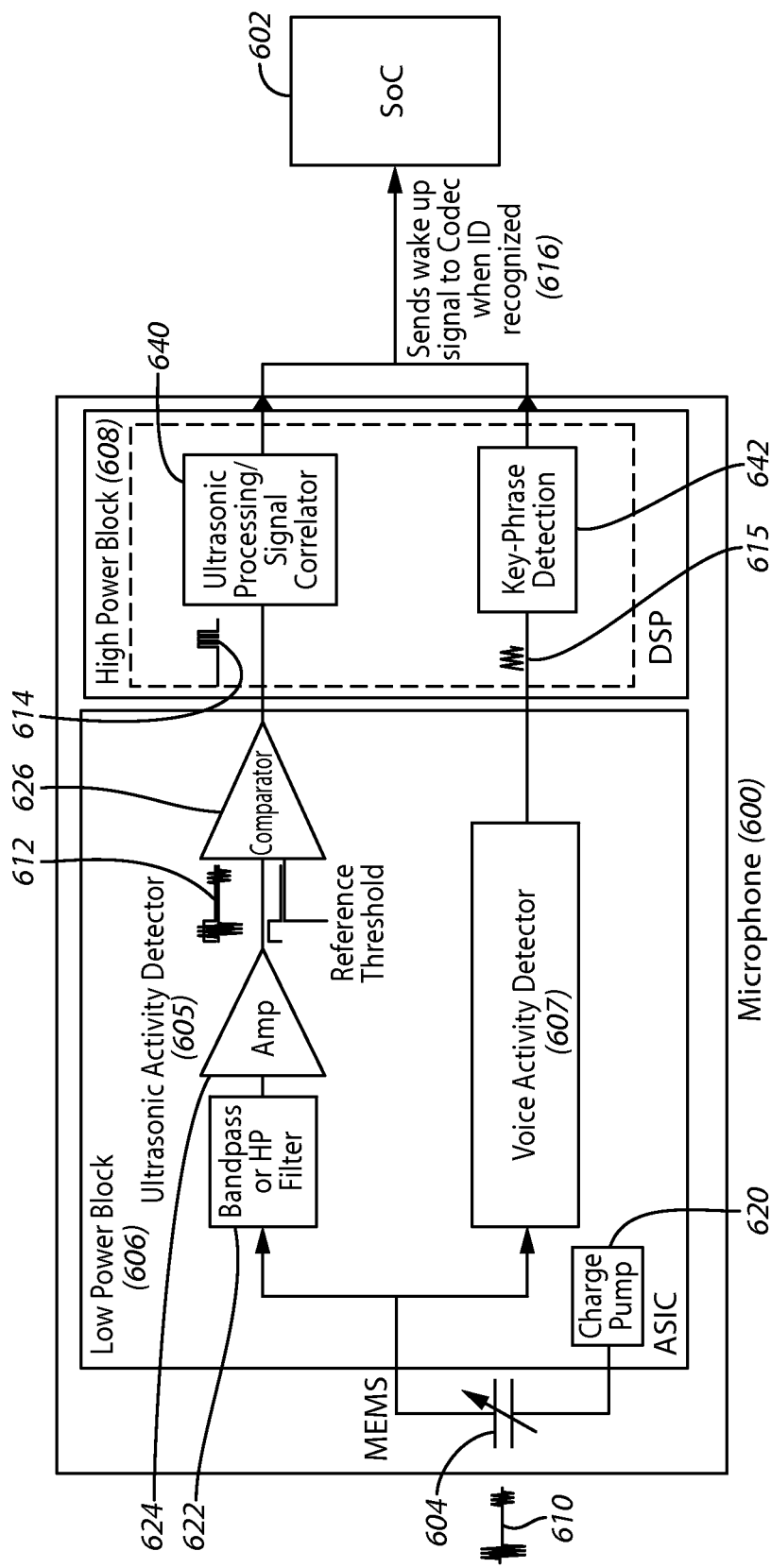
FIG. 6 comprises a block diagram of another microphone with a digital signal processor (DSP) according to various embodiments of the present invention.

Referring now to FIG. 6, another microphone with a DSP or other processing device is described. The microphone 600 transmits signals to a system on a chip (SoC) such as a processor 602. In one example, the processor 602 is a codec. The processor 602 receives signals from the microphone 600 and provides coding and/or decoding functions on these signals. For example, the processor 602 may convert analog signals into digital signals, may compress or de-compress the signals, may perform other signal processing functions, to mention a few examples. The output of the processor 602 is transmitted to other system components.

The microphone 600 includes a MEMS device 604, a low power block 606, and a high power block 608. The MEMS device 604 includes a diaphragm and back plate, and converts sound energy 610 into an electrical signals.

The low power block 606 together with the MEMS device 604 may be disposed at a single chip (single piece of silicon) such as an application specific integrated circuit (ASIC). The low power block 606 includes a charge pump 620, an ultrasonic activity detector 605 and a voice activity detector 607. The charge pump 620 provides current, voltage, or power to the MEMS device 604.

The ultrasonic activity detector 605 detects ultrasonic signals and includes a first band pass or high pass filter 622, a first amplifier 624, and a first comparator 626. The band pass or high pass filter 622 passes certain (e.g., high) ultrasonic frequencies and rejects other (e.g., lower) frequencies from the electrical signals produced by the MEMS device 604. The first amplifier 624 amplifies the signals from the band pass or high pass filter 622 to produce signals 612 and a comparator 626 compares the signals to a threshold in order to ascertain that the incoming ultrasonic signal has an adequate signal strength, thereby producing signals 614. The signals 614 are sent to the high power block 608.

The voice activity detector 607 detects voice signals/commands and generates signals 615 corresponding to the received voice signals. The signals 615 are sent to the high power block 608.

The high power block 608 (which may be a digital signal processing chip) includes an ultrasonic pattern matching module, such as a processing/correlator module 640, which performs correlation functions and a key-phrase detection module 642. More specifically, the correlator module 640 looks for a preamble in the signal 614 and compares that to acceptable preambles/identifiers. When the preamble or the identification information is recognized, a signal 616 is sent from the microphone 600 to the codec 602 to wake the codec 602. If correlation or pattern matching does not identify the signal 614, then no signal is sent to the codec 602 and the microphone 600 continues to operate in a low power mode unless voice activity is detected. In low power mode, the low power block 606 continues to sense signals, but the high power block 608 and the codec 602 are in sleep mode (consuming no power or very small amounts of power).

The key-phrase detection module 642 detects predetermined voice phrases in the signal 615. The key-phrase detection module 642 may store a list of key phrases that it compares against phrases found in the signal 615. When the key phrase is recognized, the signal 616 is sent from the microphone 600 to the processor 602 to wake the codec 602. If a key phrase is not identified in the signal 615, then no signal is sent to the processor 602 and the microphone 600 continues to operate in a low power mode unless ultrasonic activity is detected. In low power mode, the low power block 606 continues to sense signals, but the high power block 608 and the codec are in sleep mode (consuming no power or very small amounts of power).

It will be appreciated that the sound energy 610 may be encoded and the high power block 608 may decode the signal. The signal 610 may be encoded using frequency shift keying, frequency modulation, and other processing techniques.

Figure 7:
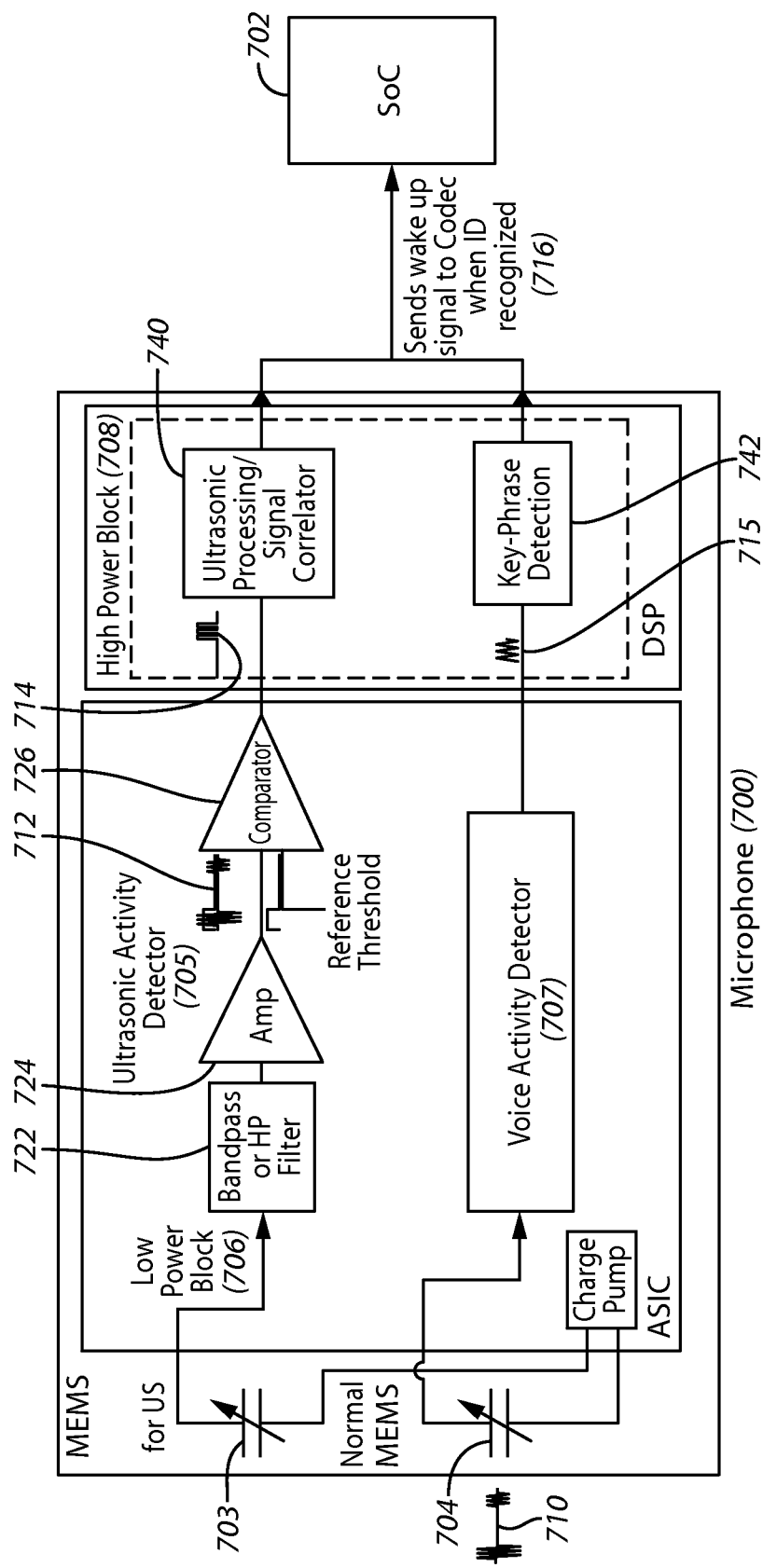
FIG. 7 comprises a block diagram of another microphone with a digital signal processor (DSP) according to various embodiments of the present invention.

Referring now to FIG. 7, another microphone with DSP or other processing device is described. The microphone 700 transmits signals to a system on a chip (SoC), such as a processor 702. In one example, the processor 702 is a codec. The processor 702 receives signals from the microphone 700 and provides coding and/or decoding functions on these signals. For example, the processor 702 may convert analog signals into digital signals, may compress or de-compress the signals, may perform other signal processing functions, to mention a few examples. The output of the processor 702 is transmitted to other system components.

The microphone 700 includes a first MEMS device 703, a second MEMS device 704, a low power block 706, and a high power block 708. The first and second MEMS devices 703 and 704 each include a diaphragm and back plate. The first MEMS device 704 is optimized for ultrasonic operation (e.g., to receive ultrasonic signals) and the second MEMS device 704 converts signals in the human audio range into electrical signals.

The low power block 706 together with the first and second MEMS devices 703 and 704 may be disposed at a single chip (single piece of silicon) such as an application specific integrated circuit (ASIC). The low power block 706 includes a charge pump 720, an ultrasonic activity detector 705 and a voice activity detector 707. The charge pump 720 provides current, voltage, or power to the first and second MEMS devices 703 and 704.

The ultrasonic activity detector 705 detects ultrasonic signals and includes a first band pass or high pass filter 722, a first amplifier 724, and a first comparator 726. The band pass or high pass filter 722 removes certain frequencies from the electrical signals produced by the first MEMS device 703. The first amplifier 724 amplifies the signals from the band pass or high pass filter 722 to produce signals 712 and the first comparator 726 compares the signals to a threshold in order to ascertain that the incoming ultrasonic signal has an adequate signal strength, thereby producing signals 714. The signals 714 are sent to the high power block 708.

The voice activity detector 707 detects voice signals/commands and generates signals corresponding to the received voice signals. The signals 715 are sent to the high power block 708.

The high power block 708 (which may be a digital signal processing chip) includes an ultrasonic pattern matching module, such as a processing/correlator module 740, which performs correlation functions and a key-phrase detection module 742. More specifically, the correlator module 740 looks for a preamble in the signal 714 and compares that to acceptable preambles/identifiers. When the preamble or the identification information is recognized, a signal 716 is sent from the microphone 700 to the processor 702 to wake the processor 702. If correlation does not identify the signal 614, then no signal is sent to the processor 702 and the microphone 700 continues to operate in a low power mode unless voice activity is detected. In low power mode, the low power block 706 continues to sense signals, but the high power block 708 and the codec are in sleep mode (consuming no power or very small amounts of power).

The key-phrase detection module 742 detects predetermined voice phrases in the signal 715. The key-phrase detection module 742 may store a list of key phrases that it compares against phrases found in the signal 715. When the key phrase is recognized, the signal 716 is sent from the microphone 700 to the processor 702 to wake the processor 702. If a key phrase is not identified in the signal 715, then no signal is sent to the processor 702 and the microphone 700 continues to operate in a low power mode unless ultrasonic activity is detected. In low power mode, the low power block 706 continues to sense signals, but the high power block 708 and the codec are in sleep mode (consuming no power or very small amounts of power).

It will be appreciated that the sound energy 710 may be encoded and the high power block 608 may decode the signal. The signal 710 may be encoded using frequency shift keying, frequency modulation, and other processing techniques.

Figure 8:
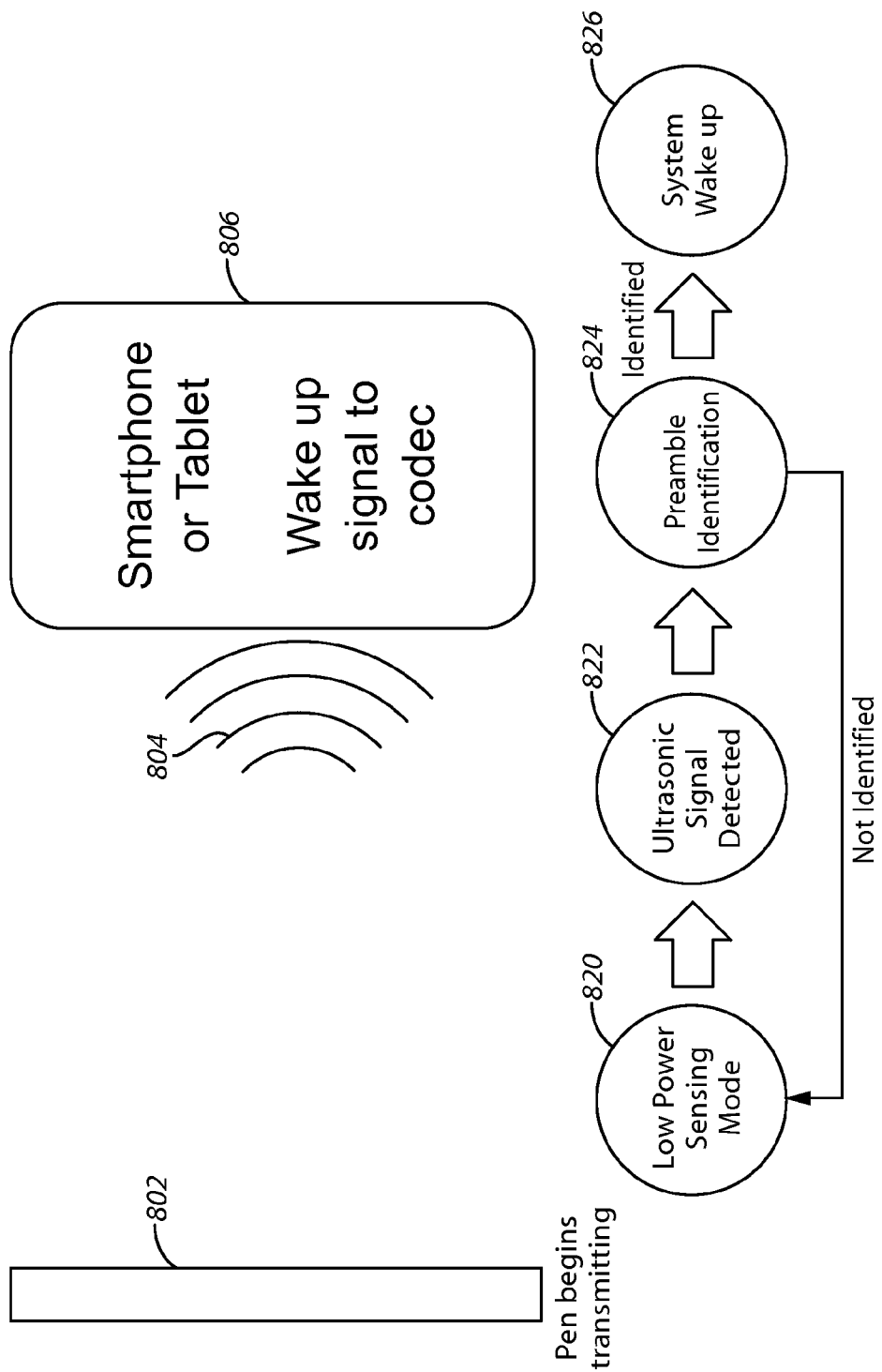
FIG. 8 comprises a block diagram of one example of an application of the present approaches according to various embodiments of the present invention.

Referring now to FIG. 8, and example of an application of the present approaches is described. In this case, a pen 802 (or similar object) is configured or equipped with an ultrasonic transmitter and transmits ultrasonic signals 804 to a smart phone or tablet 806. The smart phone or tablet 806 is includes a codec and is configured to launch an application without any user intervention. In these regards, the smart phone or tablet 806 is initially in low power sensing mode 820. An ultrasonic signal is detected at step 822. The smart phone or tablet 806 identifies a preamble in the signal at step 824. At step 826, the smart phone or tablet 806 wakes up (e.g., by waking up its codec or other system components). If a preamble is not identified, the smart phone or tablet 806 returns to the low power sensing mode 820.

Figure 9:
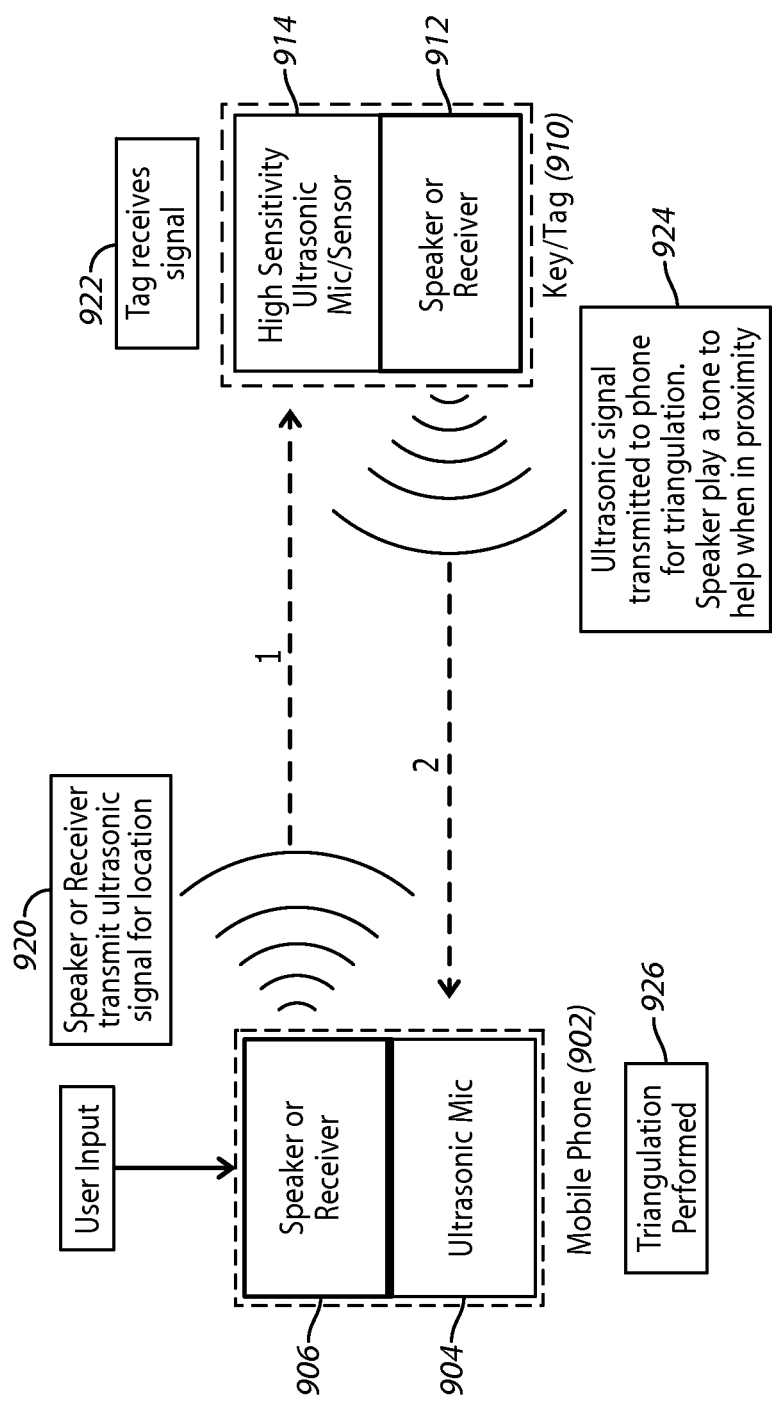
FIG. 9 comprises another example of an application of the present approaches according to various embodiments of the present invention.

Referring now to FIG. 9, another example of the application of the present approaches is described. In the example of FIG. 9, a mobile phone 902 includes an ultrasonic microphone 904, and a speaker or receiver (or any general purpose ultrasonic transducer such as a piezoelectric transducer) 906. The mobile phone 902 may also receive user input 908. The user input 908 may be of a variety of forms including voice signals, actuation of a keypad, or actuation of a touch screen. Other examples are possible.

A key or tag 910 is disposed in proximity to the microphone 902. The key or tag 910 includes a speaker or receiver (or any general purpose ultrasonic transducer such as a piezoelectric transducer) 912 and a high sensitivity ultrasonic microphone or sensor 914.

At step 920, the speaker or receiver 906 at the mobile phone 902 transmits an ultrasonic signal to the key or tag 910. At step 922, the high sensitivity ultrasonic microphone or sensor 914 receives the signal. At step 924, an ultrasonic signal is transmitted from the speaker or receiver 912 of the key or tag 910 to the mobile phone 902. At step 926, triangulation may be performed at the mobile phone 902 to determine its location. The speaker 906 may play a tone when the mobile phone 902 is in proximity to the key or tag 910.

It will be appreciated that the present approaches can be deployed in a wide variety of different environments and applications. For example, the present approaches can be applied in transportation (e.g., bus and train) environments, at parking meters.

The present approaches can be utilized at locating objects (e.g., phones, cameras, keys, wireless electronics, or TV remotes to mention a few examples. In these various applications, an integrated ultrasonic transponder at the object to-be-located would enable low power sensing mode until and ultrasonic signal is detected (from a user searching for the object). The system is turned on, and triangulation (for location determination) may be performed from a user device. The object itself may also include a sound activation device (e.g., a receiver) that is activated allowing a user to hear the sound and thereby locate the object.

Figure 10:
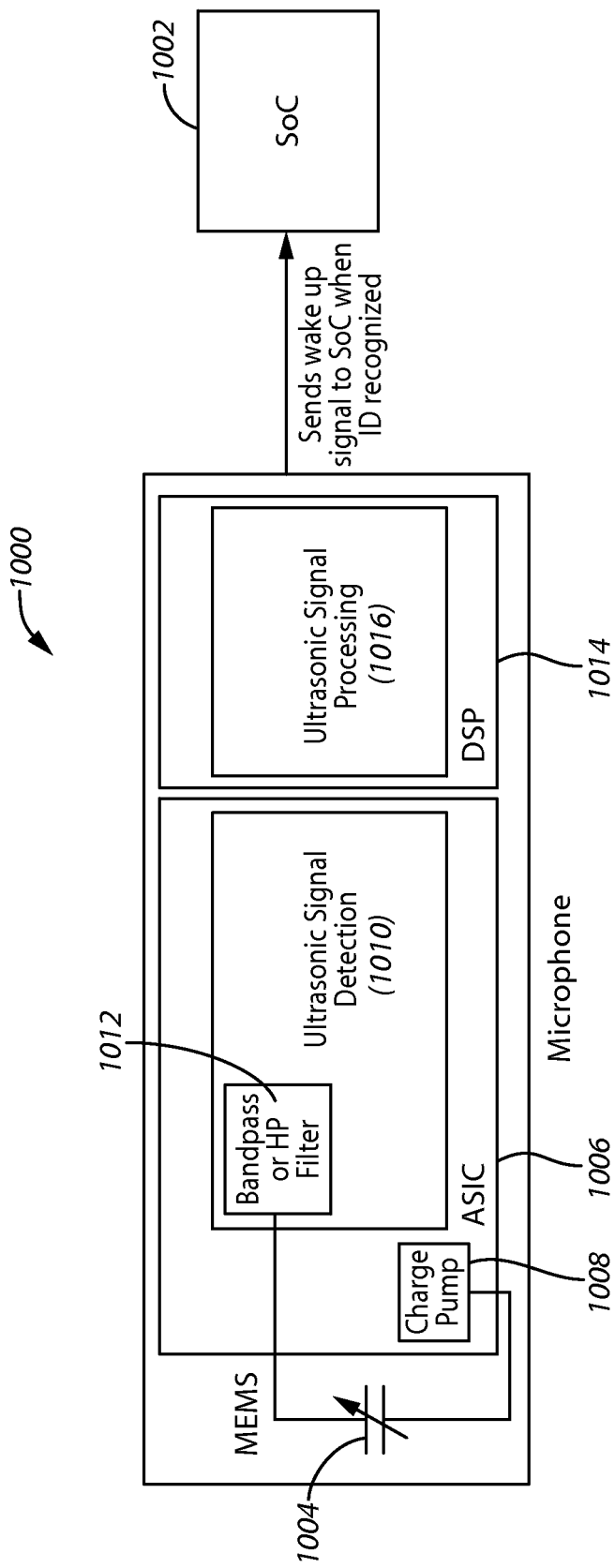
FIG. 10 comprises a block diagram with a microphone with a digital signal processor (DSP) according to various embodiments of the present invention.
Figure 11:
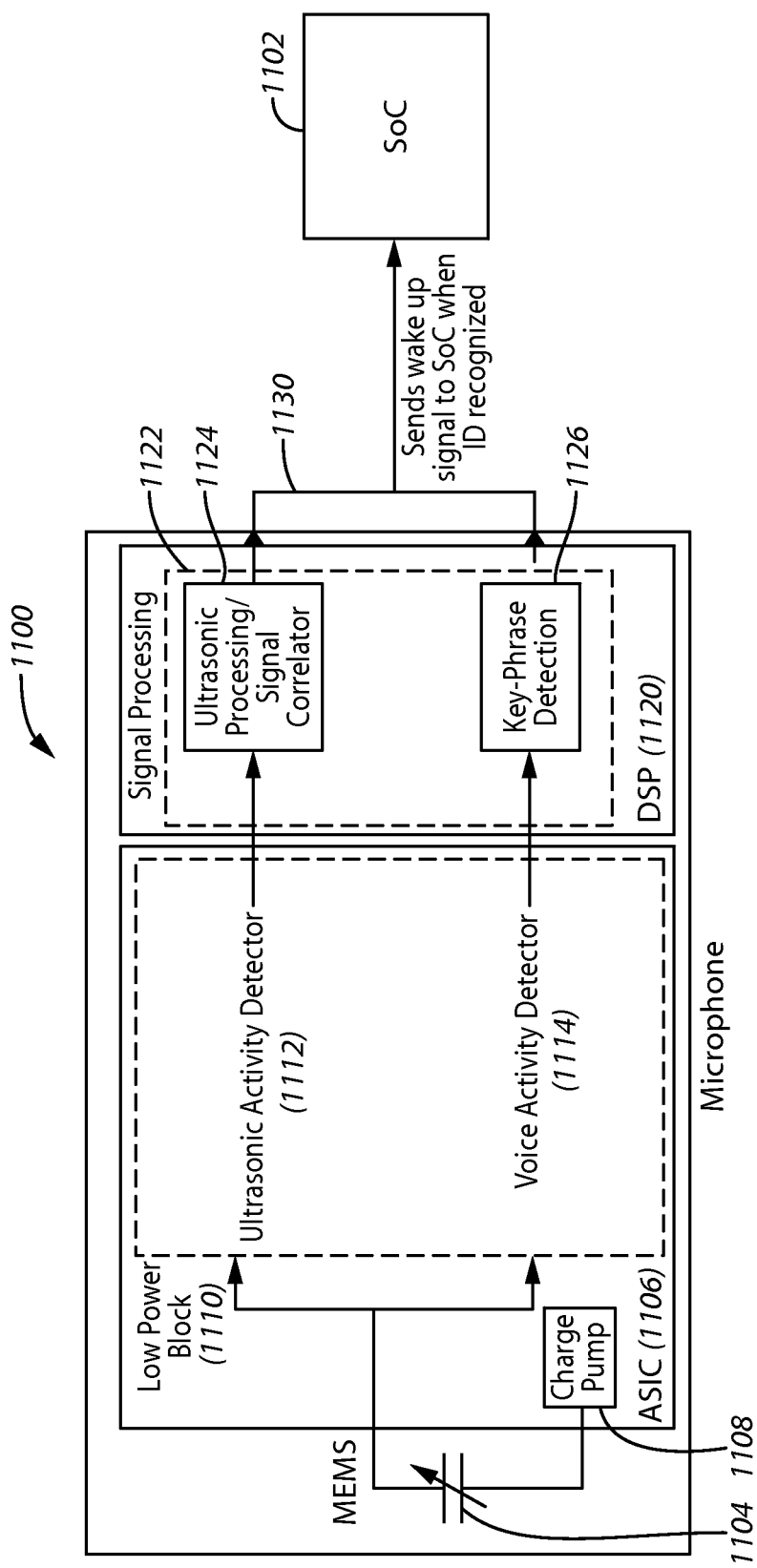
FIG. 11 comprises a block diagram of another microphone with a digital signal processor (DSP) according to various embodiments of the present invention.
Figure 12:
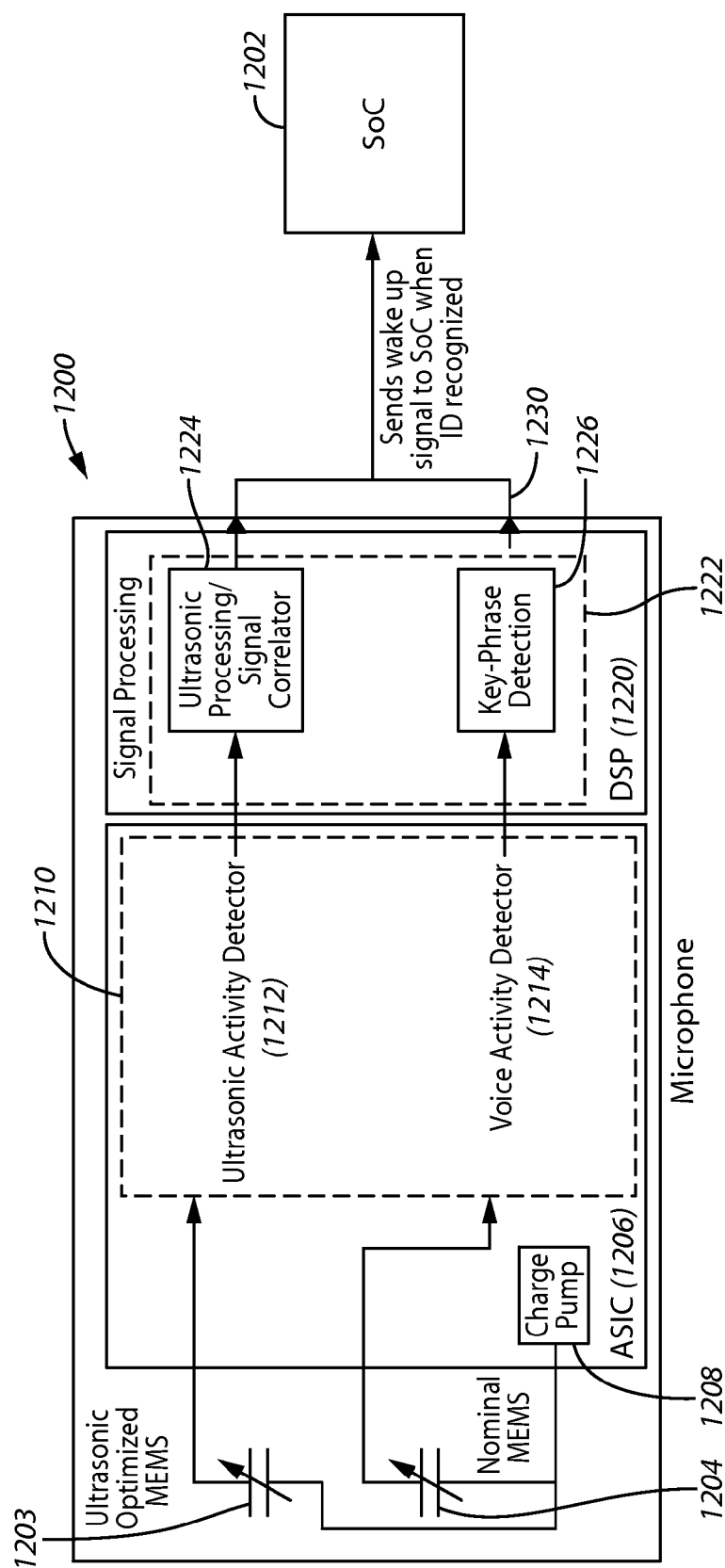
FIG. 12 comprises a block diagram of another microphone with a digital signal processor (DSP) according to various embodiments of the present invention.

Referring now to FIGS. 10-12, various examples of microphones are described. It will be appreciated that the modules, blocks, processors, or other components used to construct a microphone may be implemented using any combination of hardware and/or software components. That is, the components of the microphone are not limited to specific hardware and/or software configurations.

Referring now to FIG. 10, a microphone 1000 with a DSP or other processing device is described. The microphone 1000 transmits signals to a processor (e.g., codec) 1002. The processor (e.g., codec) 1002 receives signals from the microphone 1000 and provides coding and/or decoding functions on these signals. For example, the processor (e.g., codec) 1002 may convert analog signals into digital signals, may compress or de-compress the signals, may perform other signal processing functions, to mention a few examples. The output of the processor 1002 is transmitted to other system components.

The microphone 1000 includes a MEMS device 1004, an ASIC 1006 (including a charge pump 1008 and an ultrasonic signal detection module 1010 (which includes a band pass or high pass filter 1012) and a DSP 1014 (including an ultrasonic signal processing module 1016). The MEMS device 1004 includes a diaphragm and back plate, and converts sound energy into an electrical signals.

The ultrasonic detection module 1010 is configured to detect ultrasonic signals. In these regards, the band pass or high pass filter 1012 passes certain (e.g., high) ultrasonic frequencies and rejects other (e.g., lower) frequencies from the electrical signals produced by the MEMS device 1004. The ultrasonic signal processing module 1016 looks for a preamble in a signal received from the ultrasonic signal detection module 1010 and compares that to acceptable preambles/identifiers. When the preamble or the identification information is recognized, a signal 1018 is sent from the microphone 1000 to the processor (e.g., codec) 1002 to wake the processor (e.g., codec) 1002 and the rest of the electrical system. If correlation (or pattern matching) does not identify the signal 1016, then no signal is sent to the processor (e.g., codec) 1002 and the microphone continues to operate in a low power mode. In low power mode, the ultrasonic signal detection module 1010 continues to sense signals, but the ultrasonic signal processing module 1016 and the processor 1002 (e.g., codec) are in sleep mode (consuming no power or very small amounts of power).

Referring now to FIG. 11, another microphone with a DSP or other processing device is described. The microphone 1100 transmits signals to a processor (e.g., codec) 1102. The SoC (e.g., processor or codec) 1102 receives signals from the microphone 1100 and provides coding and/or decoding functions on these signals. For example, the processor (e.g., codec) 1102 may convert analog signals into digital signals, may compress or de-compress the signals, may perform other signal processing functions, to mention a few examples. The output of the processor (e.g., codec) 1102 is transmitted to other system components.

The microphone 1100 includes a MEMS device 1104, an ASIC 1106 (including charge pump 1108 and a low power block 1110, and a DSP 1120 that includes a signal processing module 1122. The signal processing module 1122 includes an ultrasonic pattern matching module, such as a processing/correlator module 1224, and a key-phrase detection module 1226. The MEMS device 1104 includes a diaphragm and back plate, and converts sound energy into an electrical signals. The low power block 1110 includes an ultrasonic activity detector module 1112 and a voice activity detector module 1114. The charge pump 1108 provides current, voltage, or power to the MEMS device 1104.

The ultrasonic activity detector module 1112 detects ultrasonic signals. The voice activity detector module 1114 detects voice signals/commands.

The ultrasonic processing/correlator module 1124 performs correlation (or pattern matching) functions. The correlator module 1124 looks for a preamble in the signal received from the ultrasonic activity detection module 1112 and compares that to acceptable preambles/identifiers. When the preamble or the identification information is recognized, a signal 1130 is sent from the microphone 1100 to the codec 1102 to wake the codec 1102. If correlation or pattern matching does not identify the signal, then no signal is sent to the codec 1102 and the microphone 1100 continues to operate in a low power mode unless voice activity is detected. In low power mode, the low power block 1110 continues to sense signals, but the DSP 1120 and the codec 1102 are in sleep mode (consuming no power or very small amounts of power).

The key-phrase detection module 1126 detects predetermined voice phrases in the signal received from the voice activity detector module 1114. The key-phrase detection module 1126 may store a list of key phrases that it compares against phrases found in the signal. When the key phrase is recognized, the signal 1130 is sent from the microphone 1100 to the processor (e.g., codec) 1102 to wake the codec 1102. If a key phrase is not identified in the signal, then no signal is sent to the processor (e.g., codec) 1102 and the microphone 1100 continues to operate in a low power mode unless ultrasonic activity is detected. In low power mode, the low power block 1110 continues to sense signals, but the DSP 1120 and the codec 1102 are in sleep mode (consuming no power or very small amounts of power).

Referring now to FIG. 12, another microphone with DSP or other processing device is described. The microphone 1200 transmits signals to a processor (e.g., codec) 1202. The processor (e.g., codec) 1202 receives signals from the microphone 1200 and provides coding and/or decoding functions on these signals. For example, the processor (e.g., codec) 1202 may convert analog signals into digital signals, may compress or de-compress the signals, may perform other signal processing functions, to mention a few examples. The output of the processor (e.g., codec) 1202 is transmitted to other system components.

The microphone 1200 includes a first MEMS device 1203, a second MEMS device 1204, an ASIC 1206 (including a charge pump 1208, a low power block 1210 (including an ultrasonic activity detection module 1212) and a DSP 1220 (including a signal processing module 1222). The signal processing module 1222 includes an ultrasonic pattern matching module, such as a processing/signal correlation module 1224, and a key-phrase detection module 1226. The first and second MEMS devices 1203 and 1204 each include a diaphragm and back plate. The first MEMS device 1204 is optimized for ultrasonic operation (e.g., to receive ultrasonic signals) and the second MEMS device 1204 converts signals in the human audio range into electrical signals. The charge pump 1208 provides current, voltage, or power to the MEMS devices 1203 and 1204.

The ultrasonic activity detector module 1212 detects ultrasonic signals. The voice activity detector module 1214 detects voice signals/commands.

The ultrasonic processing/correlator module 1224 performs correlation functions. The correlator module 1124 looks for a preamble in the signal received from the ultrasonic activity detection module 1212 and compares that to acceptable preambles/identifiers. When the preamble or the identification information is recognized, a signal 1230 is sent from the microphone 1200 to the codec 1202 to wake the codec 1202. If correlation or pattern matching does not identify the signal, then no signal is sent to the codec 1202 and the microphone 1200 continues to operate in a low power mode unless voice activity is detected. In low power mode, the low power block 1210 continues to sense signals, but the DSP 1220 and the codec 1202 are in sleep mode (consuming no power or very small amounts of power).

The key-phrase detection module 1226 detects predetermined voice phrases in the signal received from the voice activity detector module 1214. The key-phrase detection module 1226 may store a list of key phrases that it compares against phrases found in the signal. When the key phrase is recognized, the signal 1230 is sent from the microphone 1200 to the processor (e.g., codec) 1202 to wake the codec 1202. If a key phrase is not identified in the signal, then no signal is sent to the processor (e.g., codec) 1202 and the microphone 1200 continues to operate in a low power mode unless ultrasonic activity is detected. In low power mode, the low power block 1210 continues to sense signals, but the DSP 1220 and the codec 1202 are in sleep mode (consuming no power or very small amounts of power).

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method of operating an acoustic system, the method comprising:
   receiving an ultrasonic sound signal at a microphone;
   pattern matching the received ultrasonic sound signal to determine when the received ultrasonic sound signal is a desired ultrasonic sound signal;
   when the pattern matching indicates the received ultrasonic sound signal is the desired ultrasonic sound signal, transmitting a signal to at least one electronic component;
   when the pattern matching indicates the received ultrasonic sound signal is not the desired ultrasonic sound signal, operating the microphone in a low power state of operation.

2. The method of claim 1, wherein the pattern matching is performed at the microphone;
wherein the at least one electronic component comprises a codec; and wherein the codec performs additional application-related processing functions.

3. The method of claim 2, wherein the pattern matching is performed by a digital signal processing module (DSP) in the microphone.

4. The method of claim 2, wherein the microphone enters a processing state and consumes more power than the low power state of operation when the pattern matching is performed.

5. The method of claim 1, wherein the detecting comprises measuring a filtered signal strength and comparing the measured filtered signal strength to a predetermined threshold.

6. The method of claim 1, wherein the detecting comprises measuring a filtered signal strength and comparing the measured filtered signal strength to an adaptive or user-changeable threshold.

7. The method of claim 1, wherein the detecting utilizes a digital filter.

8. The method of claim 1, further comprising digitally shifting the received ultrasonic signal to baseband frequencies at a sub-sampled frequency rate using aliasing.

9. The method of claim 1, wherein the at least one electronic component is a processor and transmitting the signal includes transmitting a first wakeup signal to the processor;
wherein pattern matching includes performing pattern matching with the processor; and
further comprising transmitting a second wake up signal to a component that is separate from the processor and the microphone.

10. The method of claim 1, wherein transmitting the signal to the at least one electronic component includes transmitting the signal to the at least one electronic component to cause the electronic component to perform at least one of the following operations:
wake up; and
launch an application.

11. An apparatus, the apparatus comprising:
a detector configured to receive an ultrasonic sound signal at a microphone; and
a pattern matching module coupled to the detector, the pattern matching module configured to pattern match the received ultrasonic sound signal to determine when the received ultrasonic sound signal is a desired ultrasonic sound signal and when the pattern matching module indicates the received sound signal is the desired ultrasonic sound signal, transmitting a signal to at least one electronic component, and when the pattern matching module indicates the received ultrasonic sound signal is not the desired ultrasonic sound signal, operate the microphone in a low power state of operation.

12. The apparatus of claim 11, wherein the pattern matching module is disposed at the microphone;
wherein the at least one electronic component comprises a processor; and
wherein the processor performs additional application-related processing functions.

13. The apparatus of claim 12, wherein the pattern matching module comprises a digital signal processing module (DSP) in the microphone.

14. The apparatus of claim 12, wherein the microphone enters a processing state consuming more power than the low power state of operation when the pattern matching is performed.

15. The apparatus of claim 11, wherein the detector measures a filtered signal strength and compares the measured filtered signal strength to a predetermined threshold.

16. The apparatus of claim 11 wherein the detector measures a filtered signal strength and compares the measured filtered signal strength to an adaptive and user-changeable threshold.

17. The apparatus of claim 11, wherein the detector utilizes a digital filter.

18. The apparatus of claim 11, wherein the received ultrasonic signals are digitally shifted to a baseband at a sub-sampled frequency rate.

19. The apparatus of claim 11, wherein the pattern matching module is configured to transmit the signal to the at least one electronic component that causes the at least one electronic component to launch an application when the received ultrasonic signal is the desired ultrasonic sound signal.

20. The apparatus of claim 11, wherein the pattern matching module is configured to transmit a wakeup signal to the at least one electronic component when the received ultrasonic signal is the desired ultrasonic sound signal.

21. A method of operating an acoustic system, the method comprising:
operating a microphone in a first state of operation such that in the first state of operation the microphone receives an ultrasonic sound signal and determines whether the received ultrasonic signal is a desired ultrasonic sound signal;
such that when the microphone determines that the received ultrasonic sound signal is the desired ultrasonic sound signal, the microphone enters a second state of operation, the second state of operation consuming more power than the first state of operation, and such that in the second state of operation the microphone transmits the signal to at least one electronic component; and
when the microphone determines that the received ultrasonic sound signal is not the desired ultrasonic sound signal, the microphone returns to the first state of operation.

22. The method of claim 21, wherein the processor is a codec.

23. The method of claim 21, wherein the determination of whether the ultrasonic sound signal is a desired ultrasonic sound signal utilizes a measured filtered signal strength and a comparison is made between the filtered signal strength and a predetermined threshold.

24. The method of claim 21, wherein the determination of whether the ultrasonic sound signal is a desired ultrasonic sound signal utilizes a measured filtered signal strength and a comparison is made between the filtered signal strength and an adaptive and user-changeable threshold.

25. The method of claim 21, wherein a digital filter is used to determine whether the received ultrasonic sound signal is a desired ultrasonic sound signal.

26. The method of claim 21, further comprising digitally shifting the received ultrasonic signal to a baseband at a sub-sampled frequency rate.

27. The method of claim 21, wherein in the second state of operation the microphone transmits the signal to the at least one electronic component that causes the at least one electronic component to perform at least one of the following operations:

wake up; and launch an application.

28. A method of operating an acoustic system, the method comprising:

receiving an ultrasonic sound signal at a microphone;

upon detecting the ultrasonic sound signal at the microphone, transmitting a first wake-up signal to a processor;

receiving the first wake-up signal at the processor and responsively waking up the processor;

at the processor pattern matching the received ultrasonic sound signal to determine when the received ultrasonic sound signal is a desired ultrasonic sound signal;

when the pattern matching indicates the received ultrasonic sound signal is the desired ultrasonic sound signal, sending a signal from the processor to at least one electronic component;

when the pattern matching indicates the received ultrasonic sound signal is not the desired ultrasonic sound signal, operating the microphone in a low power mode of operation.

29. The method of claim 28, wherein the processor s a codec.

30. The method of claim 28, wherein the determination of whether the received ultrasonic sound signal is the desired ultrasonic sound signal utilizes a measured filtered signal strength and a comparison is made between the filtered signal strength and a predetermined threshold.

31. The method of claim 28, wherein the determination of whether the received ultrasonic sound signal is the desired ultrasonic sound signal utilizes a measured filtered signal strength and a comparison is made between the ultrasonic signal strength and an adaptive and user-changeable threshold.

32. The method of claim 28, wherein receiving the ultrasonic sound signal is accomplished via a digital filter.

33. The method of claim 28, further comprising at the processor digitally shifting the received, ultrasonic signal to a baseband at a sub-sampled frequency rate.

34. The method of claim 28 wherein sending the signal from the processor to the at least one electronic component includes sending the signal to the at least one electronic component to cause the at least one electronic component to perform at least one of the following operations:

wakeup; and launch an application.

* * * * *